United States Patent [19]

Rupp

[11] Patent Number: 5,778,817
[45] Date of Patent: Jul. 14, 1998

[54] OUTRIGGER SYSTEMS FOR MOTORBOATS

[76] Inventor: Scott A. Rupp. 4761 Anchor Ave., Port Salerno, Fla. 33492

[21] Appl. No.: 756,612

[22] Filed: Nov. 26, 1996

[51] Int. Cl.$^6$ .................................................. B63B 17/00
[52] U.S. Cl. ...................... 114/255; 114/343; 43/21.2; 248/514; 403/104
[58] Field of Search ...................... 114/255, 343, 114/361; 43/21.2; 212/292; 403/83, 104; 248/514, 521, 532, 534, 535, 538, 539

[56] References Cited

U.S. PATENT DOCUMENTS

| 4,993,346 | 2/1991 | Rupp | 114/255 |
| 5,592,893 | 1/1997 | Jordan, III et al. | 114/255 |

*Primary Examiner*—Sherman Basinger
*Attorney, Agent, or Firm*—Carroll F. Palmer

[57] ABSTRACT

An improved locking unit is disclosed for outrigger devices that are installed on a T-top equipped motorboat that has an outrigger pole supported by its inboard end above the T-top and which permits the outrigger pole to be rotated from a stowage position to a trolling position and vis versa by a person safely standing in the motorboat in the shelter of the T-top by manipulation of an improved locking unit which includes (a) a tubular member that extends through the T-top, (b) an arcuate tube, that supports the inboard end of the outrigger pole, is rotatably carried in the tubular member and has a radial hole in its lower end, (c) a locking collar fixed to the bottom end of the tubular member and having a quadrant long horizontal slot in its middle portion, (d) the inside end of a pin member extends through the radial hole & the horizontal slot and its outside end has a shackle, (e) a lever rod is pivoted at one end to the shackle and (f) the locking collar has indexing lugs to retain the lever rod in different circumferential positions. To reposition the outrigger pole, the lever rod is pulled out of one indexing lug, moved sideways and then pushed into a different indexing lug.

4 Claims, 2 Drawing Sheets

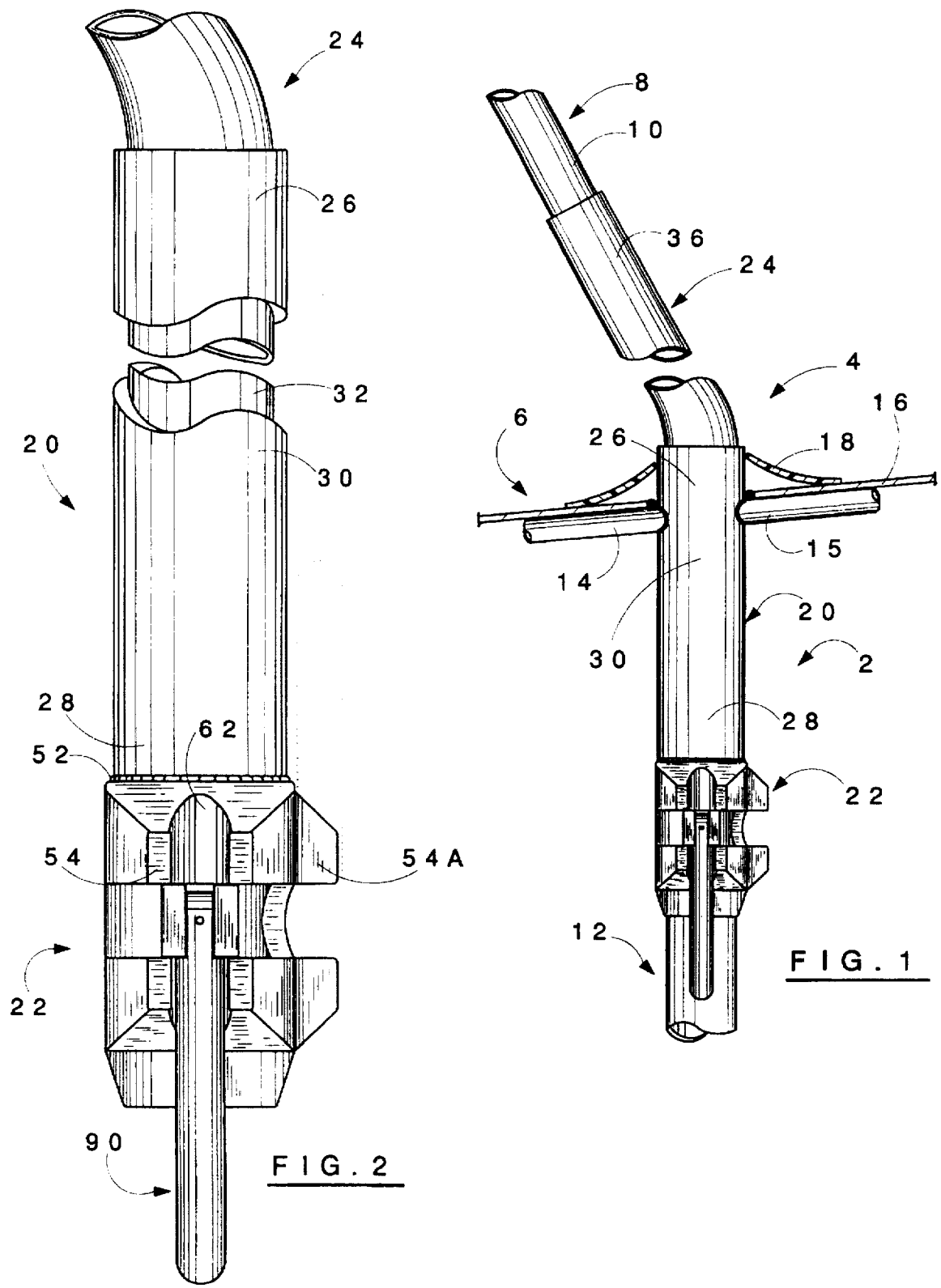

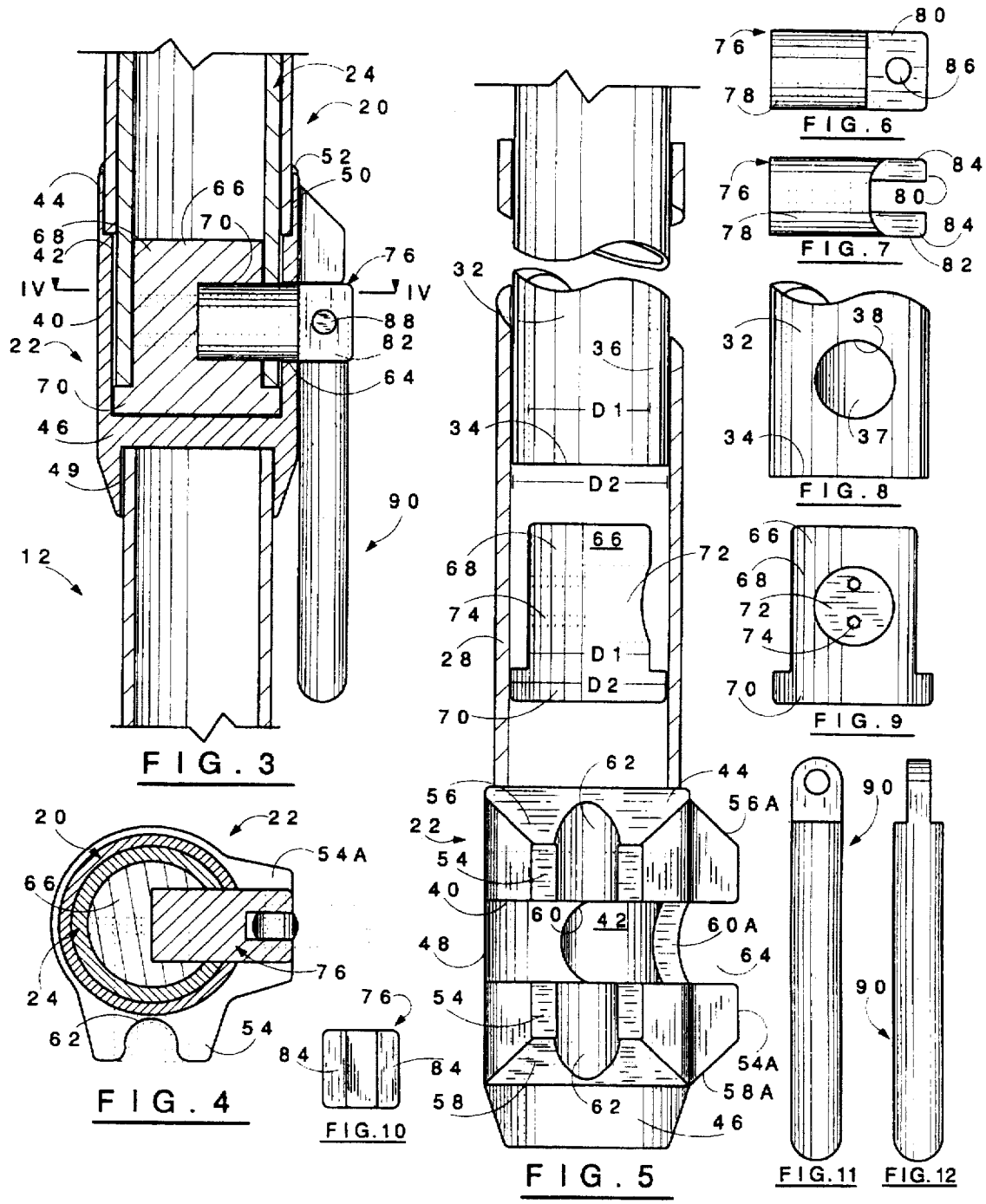

OUTRIGGER SYSTEMS FOR MOTORBOATS

BACKGROUND OF THE INVENTION

1. Field of the Invention

This application relates to outrigger systems for use with motorboats, especially center console type motorboats fitted with so-called T-tops.

2. Description of the Prior Art

The assignee of this present invention is the owner of U.S. Pat. No. 4,993,346, which is incorporated herein by reference.

That patent concerns a new type of outrigger device for use on T-top equipped motorboats which permits the outriggers thereon installed over the T-top to be moved from a stowage position to a trolling position and vis versa by an occupant of the boat standing in the shelter of the T-top. Such improved outriggers eliminated the need of some person aboard the boat to reach over the T-top to move the outrigger which was the unsafe procedure typically required for outrigger positioning before the invention covered by that patent. The important safety advantage of the improved T-top outriggers was quickly recognized by sport fishermen creating a ready market for the patented outrigger systems.

The present invention makes further improvements in the improved type outrigger systems of the invention covered in U.S. Pat. No. 4,993,346.

OBJECTS

A principal object of the invention is the provision of further improvements in the type of outrigger systems for motorboats provided by the invention disclosed in U.S. Pat. No. 4,993,346.

Another object is the provision of locking means for such improved outrigger systems that can withstand abusive handling by casual users.

A further object is the provision of locking means for T-top motorboat outrigger systems that are intutive in use thereby requiring little preuse instruction.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of improved locking means for outrigger devices that are installed on a T-top equipped motorboat that has an outrigger pole supported by its inboard end above the T-top and which permits the outrigger pole to be rotated from a stowage position to a trolling position and vis versa by a person safely standing in the motorboat in the shelter of the T-top by manipulation of locking means.

The new locking means of the invention comprises in combination (a) a tubular member that extends through the T-top, (b) an arcuate tube rotatably carried in the tubular member in which the inboard end of the outrigger pole is carried, (c) a locking collar having a horizontal, quadrant length slot in its middle portion, (d) a columnar member having a shackle on its outside end that extends through such collar slot, (e) a lever rod pivoted at one end to the shackle and (f) indexing means carried by the locking collar to hold the lever rod in a plurality of circumferential positions.

In preferred embodiments, the tubular member is defined by a longitudinal axis, an upper end portion and a lower end portion joined integrally to a central portion with the upper end portion positioned above the T-top and the lower end portion positioned below the T-top.

Further, the arcuate tube is defined by a bottom portion positioned below the T-top and a top portion extending beyond the upper end portion of the tubular member at an angle relative to the longitudinal axis of the tubular member. The arcuate tube has a hole of given perimeter through its bottom portion adjacent the bottom end.

Also, the locking collar has a contoured outside surface, an inside cylindrical surface that rotatably receives the bottom portion of the arcuate tube, an upper end section and a lower end section and is fixed by its upper end section to the lower end portion of the tubular member.

The contoured outside surface is defined in part by a lateral first lug including a top portion, a bottom portion and a central portion. Such lug has a longitudinal groove therein extending and longitudinally aligned from the top portion to the bottom portion.

The contoured outside surface has a second duplicate lateral lug positioned about one quadrant apart from the first lug and a horizontal slot extends radially through the locking collar from the contoured outside surface to the inside cylindrical surface and horizontally through the central portions of the first and second lugs.

A cylindrical plug is fitted into the bottom end of the arcurate tube and has a radial cavity therein with a cross-section that mimics the perimeter of the hole in the arcurate tube. Such cavity is aligned with the hole in the arcuate tube.

The columnar member is defined by a fore portion that has the shackle and an aft portion having a cross-section that mimics the perimeter of the hole in the arcuate tube and that is removably fixed in the cavity of the cylindrical plug.

BRIEF DESCRIPTION OF THE DRAWINGS

A more complete understanding of the invention can be obtained by reference to the accompanying drawings in which generic parts of the illustrated matter are indicated by arrowhead lines associated with the designation numerals while specific parts are indicated with plain lines associated with the numerals and wherein:

FIG. 1 is a fragmented, partially sectionalized, lateral view of a T-top motorboat outrigger system constructed in accorance with the invention.

FIG. 2 is an enlarged fragmentary view of the outrigger system shown in FIG. 1.

FIG. 3 is an enlarged fragmentary lateral sectional view of the outrigger system shown in FIG. 1.

FIG. 4 is a sectional view taken on the line IV—IV of FIG. 3.

FIG. 5 is an exploded fragmentary lateral sectional view corresponding to unexploded view FIG. 3.

FIG. 6 is an isolated lateral view of a component shown assembled in FIG. 3.

FIG. 7 is a plan view of the component shown in FIG. 6.

FIG. 8 is a rotated lateral view of the fragment of a part shown adjacent in FIG. 5.

FIG. 9 is a rotated lateral view of a part shown adjacent in FIG. 5.

FIG. 10 is the end view of the component shown in FIG. 6.

FIG. 11 is a lateral view of a lever member shown in FIG. 3.

FIG. 12 is a 90° rotation of the view shown in FIG. 11.

DESCRIPTION OF THE PREFERRED EMBODIMENTS

With reference in detail to the drawings, the improved locking means 2 of the invention is for an outrigger device 4 that is installed on a T-top 6 of a motorboat (not shown) that has an outrigger pole 8 supported by its inboard end 10 above the T-top 6 by which the outrigger pole 8 is moved by rotation of the end 10 between a trolling position (as shown) and stowage position (not shown).

So the load of the outrigger device 4 will not need to be carried solely by the T-top 6, the locking means 2 has depending therefrom a tubular standard 12 that extends to the cockpit sole (not shown) of the motorboat. The T-top installation typically also includes support struts 14 & 15, fabric 16, flexible closure 18 and other components as further disclosed in U.S. Pat. No. 4,993,346.

The locking means 2 comprises a tubular member 20, a locking collar 22, an arcuate tube 24 and further components described below.

The tubular member 20, which extends straight along its longitudinal axis and through the T-top 6, has an upper end portion 26 and a lower end portion 28 joined integrally to center portion 30.

The arcuate tube 24, which is alinged with the longitudinal axis of tubular member 20 and rotatably carried therein, includes a bottom portion 32 with a bottom end 34 positioned below the T-top 6, a top portion 36 extending beyond the upper end portion 26 and at an angle relative to the longitudinal axis of the tubular member 20, and has a hole 37 of given perimeter 38 through the bottom portion 32 adjacent the bottom end 34.

The locking collar 22 comprises a contoured outside surface 40, an inside cylindrical surface 42 that rotatably receives the bottom portion 32 of the arcuate tube 24 (see FIG. 3), an upper end section 44, a lower end section 46, a central section 48, which includes the surface 40 and a recess 49 to receive the upper end of the tubular standard 12.

The upper end section 44 of locking collar 22 contains a ledge 50 to receive the lower end portion 28 of tubular member 20 and collar 22 is fixed to member 20 by welding 52.

The contoured outside surface 40 has a lateral first lug 54 with a top portion 56, a bottom portion 58, a central portion 60 and a longitudinal groove 62 extending axially aligned from the top portion 56 to the bottom portion 58.

Contoured outside surface 40 further has a lateral second lug 54A positioned therein approximately 90° relative to the first lug 54. Lug 54A mimics lug 54 with a top portion 56A, a bottom portion 58A, a central portion 60A and a longitudinal groove (not shown) that extends axially aligned from the top portion 56A to the bottom portion 58A.

A horizontal slot 64 extends radially through the locking collar 22 from the contoured outside surface 40 to the inside cylindrical surface 42 and horizontally from and through the first central portion 60 to and through the second central portion 60A.

A cylindrical plug 66, which fits into the bottom end 34 of the arcurate tube 24, comprises a main body portion 68 having a diameter D1 about equal to the inside diameter of the bottom portion of the arcuate tube 24 and a end cap portion 70 having a diameter D2 about equal to the outside diameter of the bottom portion of the arcuate tube 24.

Plug 66 has a radial cavity 72 therein with a cross-section that mimics the perimeter 38 of the hole 36 in the arcurate tube 24 and cavity 72 is aligned (see FIG. 3) with the hole 36. Plug 66 further contains bores 74 to receive fasteners (not shown).

A columnar member 76 has a fore portion 78 and an aft portion 80, the latter having a cross-section that mimics the cross-section of cavity 72 while the fore portion comprises a shackle 82 formed by arms 84 containing bores 86 that receive a shackle pin 88.

The aft portion 80 extends through the hole 36 plus the slot 64 and is removably fixed by fasteners positioned in bores 74 in the cavity 72 of the cylindrical plug 66 with the shackle 82 extending beyond the slot 64.

A lever rod 90 pivoted at end 92 by pin 88 to the shackle 82 is sized to fit snugly into the longitudinal groove 62 of the first lug 54 and the similar groove in lug 54A.

The improved locking means 2 is intutive in use thereby requiring little or no prior instruction of persons as to. Thus, to move the outrigger pole 8 between a trolling position as shown in FIG. 1 and stowage position, a user simply pulls the lever rod 90 out of the groove 62 in lug 54, raises it about horizontal, swings it through an approximate 90° arc to the lug 54A and pushes it into the retention groove of lug 54A. It will be apparent that the configuration of the locking collar 22 permits the lever rod to be locked in a down position as shown in FIGS. 1 & 2 or in an up position as shown in phantom in FIG. 2.

In addition to the intutive use feature of the improved outrigger systems 2, they are also noteworthy because their construction enables them to withstand abusive handling by casual users without damage in view of their simplicity of operation, the robust nature of the locking means parts and the manner in which these parts interconnect.

I claim:

1. In an outrigger device installed on a T-top equipped motorboat having an outrigger pole supported by its inboard end above said T-top and which permits said outrigger pole to be rotated from a stowage position to a trolling position and vis versa by a person safely standing in said motorboat in the shelter of said T-top by manipulation of locking means, the improvement in said locking means which comprises:

a tubular member defined by a longitudinal axis, an upper end portion and a lower end portion joined integrally to a center portion that extends through said T-top, an arcuate tube alinged with said longitudinal axis and rotatably carried in said tubular member defined by a bottom portion with a bottom end positioned below said T-top and a top portion extending beyond said upper end portion and at an angle relative to said longitudinal axis of said tubular member, said arcuate tube having a hole of given perimeter through said bottom portion adjacent said bottom end, a locking collar defined by a contoured outside surface, an inside cylindrical surface axially aligned with said longitudinal axis that rotatably receives said bottom portion of said arcuate tube, an upper end section, a lower end section and a central section, said locking collar being fixed by said upper end section to said lower end portion of said tubular member, said contoured outside surface being defined in part by a lateral first lug including a first top portion, a first bottom portion and a first central portion, said first lug having a longitudinal groove therein extending axially aligned with said longitudinal axis from said first top portion to said first bottom portion said contoured outside surface being further defined by a lateral second lug including a second top portion, a second bottom portion and a second central portion, said second lug having a longitudinal groove therein extending axially aligned with said longitudinal axis from said second top portion to said second bottom portion, said second lug being positioned in said contoured outside surface approximately 90° relative to said first lug, a horizontal slot extending radially through said locking collar from said contoured outside surface to said inside cylindrical surface and horizontally from and through said first central portion to and through said second central portion, a cylindrical plug fitted into said bottom end of said arcurate tube and having a radial cavity therein with a cross-section that mimics said perimeter of said hole in said arcurate tube, said cavity being aligned with said hole, a columnar member defined by a fore portion and an aft portion, said aft portion having a cross-section that mimics said cavity cross-section and said fore portion comprising a shackle, said aft portion extending through said hole plus said slot and being removably fixed by fasteners in said cavity of said cylindrical plug with said shackle extending beyond said slot, and a lever rod pivoted at one end to said shackle and sized to fit snugly into said longitudinal grooves of said first and second lugs.

2. The outrigger device of claim 1 wherein said cylindrical plug comprises a main body portion having a diameter about equal to the inside diameter of said bottom portion of said arcuate tube and a end cap portion having a diameter about equal to the outside diameter of said bottom portion of said arcuate tube.

3. The outrigger device of claim 1 wherein said hole, cavity and aft portion cross-sections are circular.

4. The outrigger device of claim 1 wherein said locking collar is fixed to said lower end portion of said tubular member by welding.

* * * * *